(12) United States Patent
Knowles

(10) Patent No.: US 6,186,211 B1
(45) Date of Patent: Feb. 13, 2001

(54) WINDOW ASSEMBLY WITH A MOTORIZED WINDOW SHADE MECHANISM

(75) Inventor: Byron R. Knowles, Palm Beach Gardens, FL (US)

(73) Assignee: Aerospace Technologies Group, Inc., Palm Beach Gardens, FL (US)

(*) Notice: Under 35 U.S.C. 154(b), the term of this patent shall be extended for 0 days.

(21) Appl. No.: 09/255,180

(22) Filed: Feb. 22, 1999

(51) Int. Cl.$^7$ ....................................................... E06B 9/34
(52) U.S. Cl. ....................................................... 160/84.02
(58) Field of Search ........................ 160/84.02, 1, 7, 160/168.1 P, 176.1 P, 188, 310, 311, 243, DIG. 17

(56) References Cited

U.S. PATENT DOCUMENTS

| | | | |
|---|---|---|---|
| 4,807,686 | * | 2/1989 | Schnebly et al. .................. 160/84.02 |
| 4,852,627 | * | 8/1989 | Peterson et al. .................. 160/84.02 |
| 4,945,969 | * | 8/1990 | Schnebly et al. ............. 160/273.1 X |
| 4,998,576 | * | 3/1991 | Moreno ......................... 160/84.02 X |
| 5,141,041 | * | 8/1992 | Katz et al. ......................... 160/84.02 |

* cited by examiner

Primary Examiner—David M. Purol
(74) Attorney, Agent, or Firm—Frishauf, Holtz, Goodman, Langer & Chick, P. C.

(57) ABSTRACT

A motorized window shade assembly for operating a window shade having a rail attached to one end of the shade to extend and compress the shade with movement of the rail. The motorized window shade assembly includes a shell having two sidewalls, and a rail extending between the two sidewalls of the shell. The sidewalls have respective opposed inner surfaces with a channel therein, shoulders adjacent and perpendicular to the inner surfaces, respectively, and a traction surface on each of the shoulders. An axle is rotatingly coupled to the rail and has a traction wheel coupled to each end thereof. Opposite tips of the axle ride within the channels in the sidewalls, and the traction wheels engage the traction surface. A motor is attached to the rail and is drivingly coupled to the axle.

4 Claims, 8 Drawing Sheets

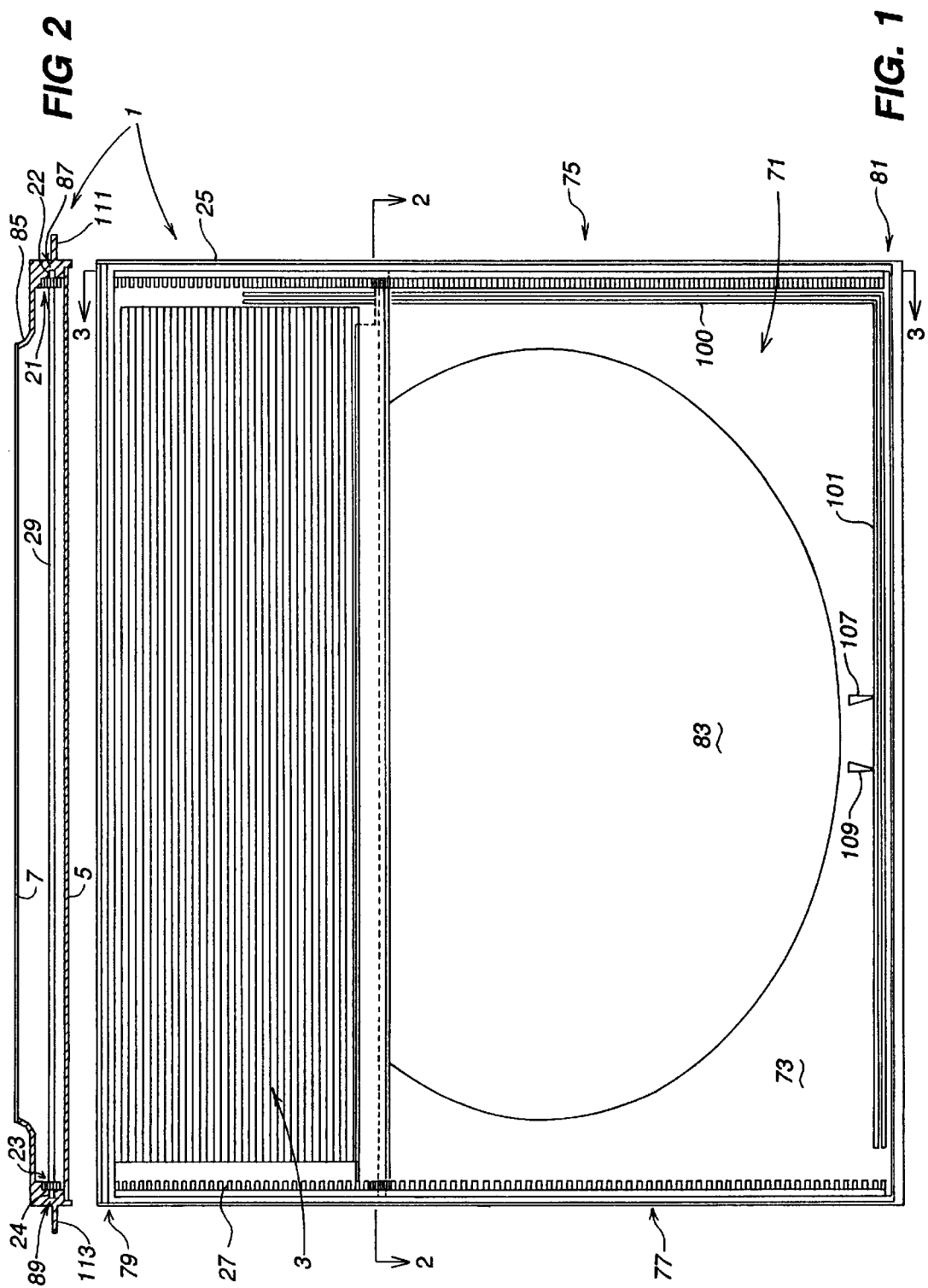

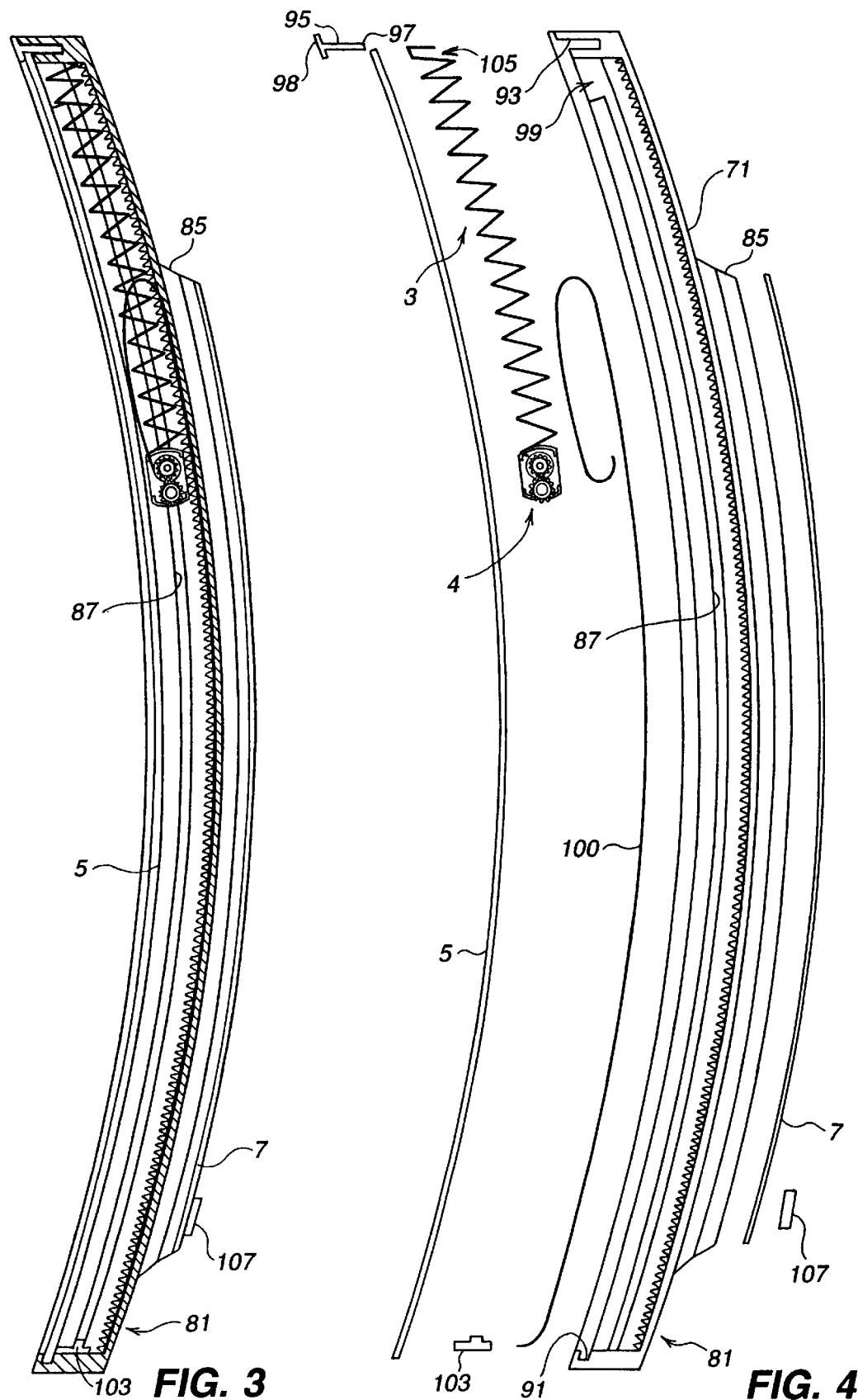

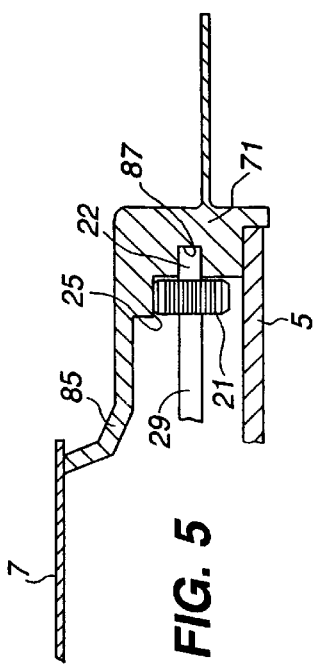
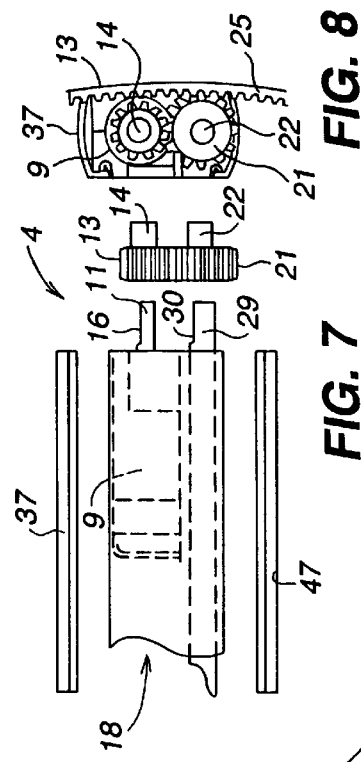
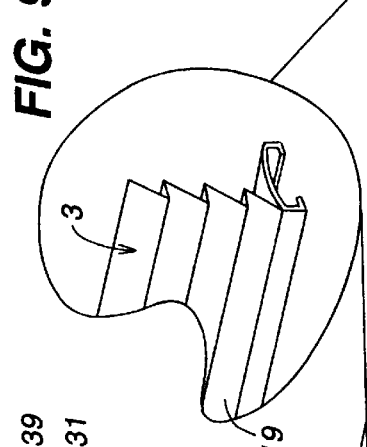
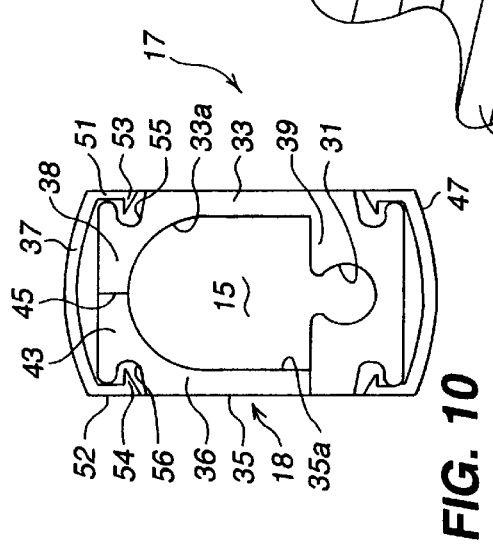
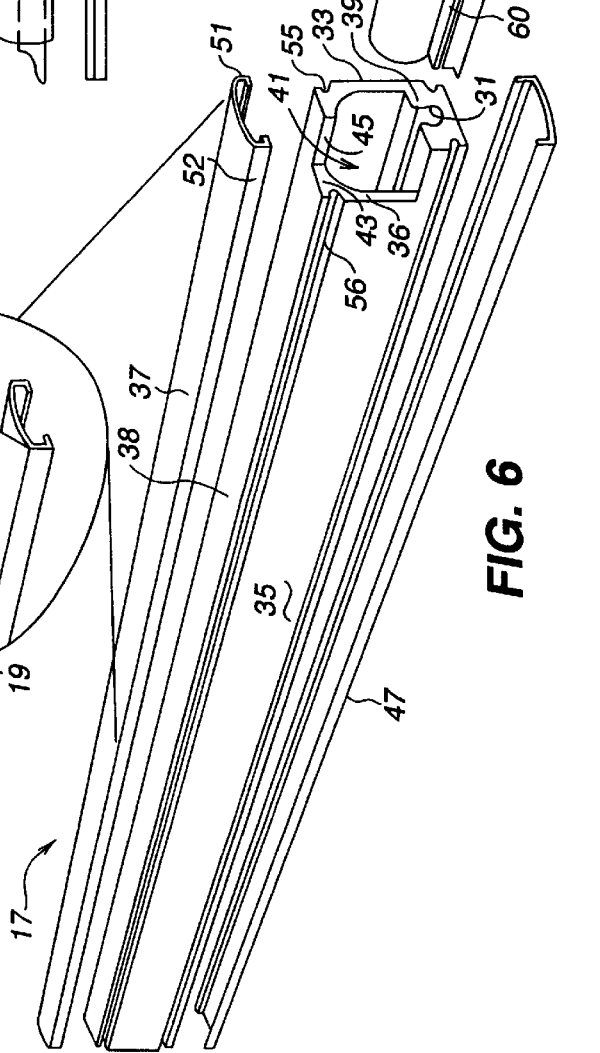

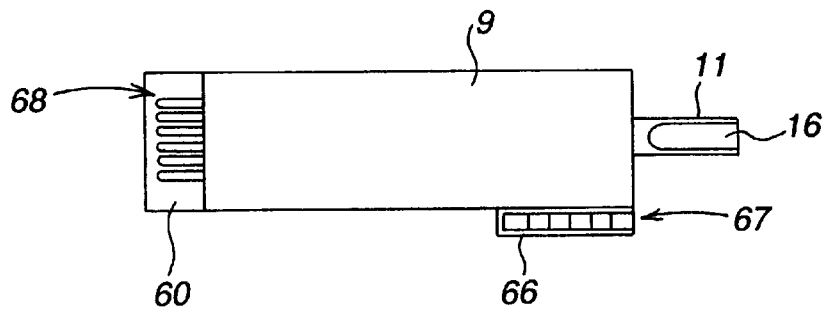
FIG. 11
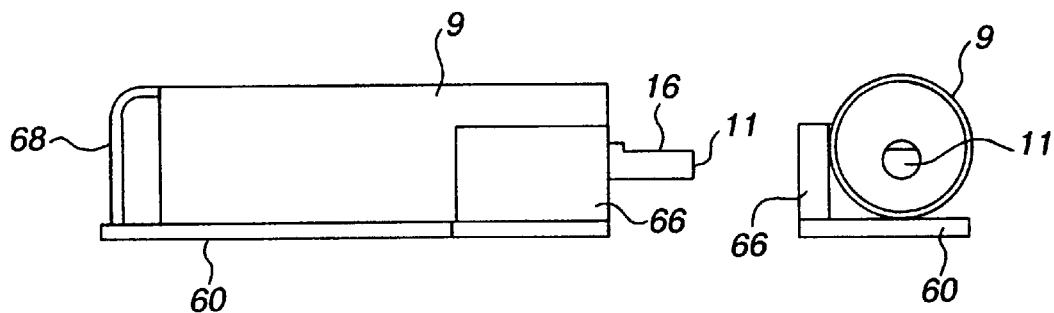
FIG. 12   FIG. 13
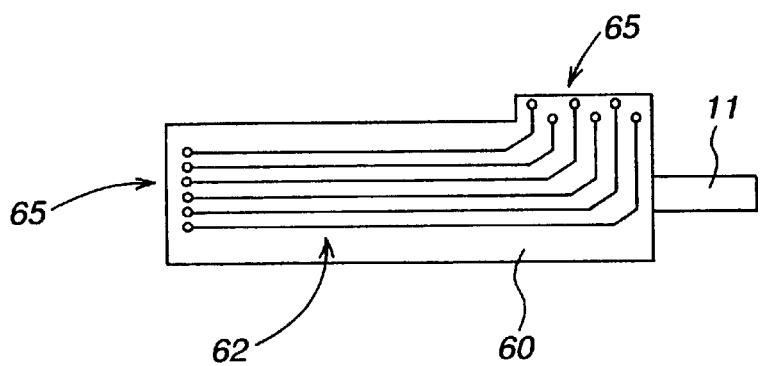
FIG. 14

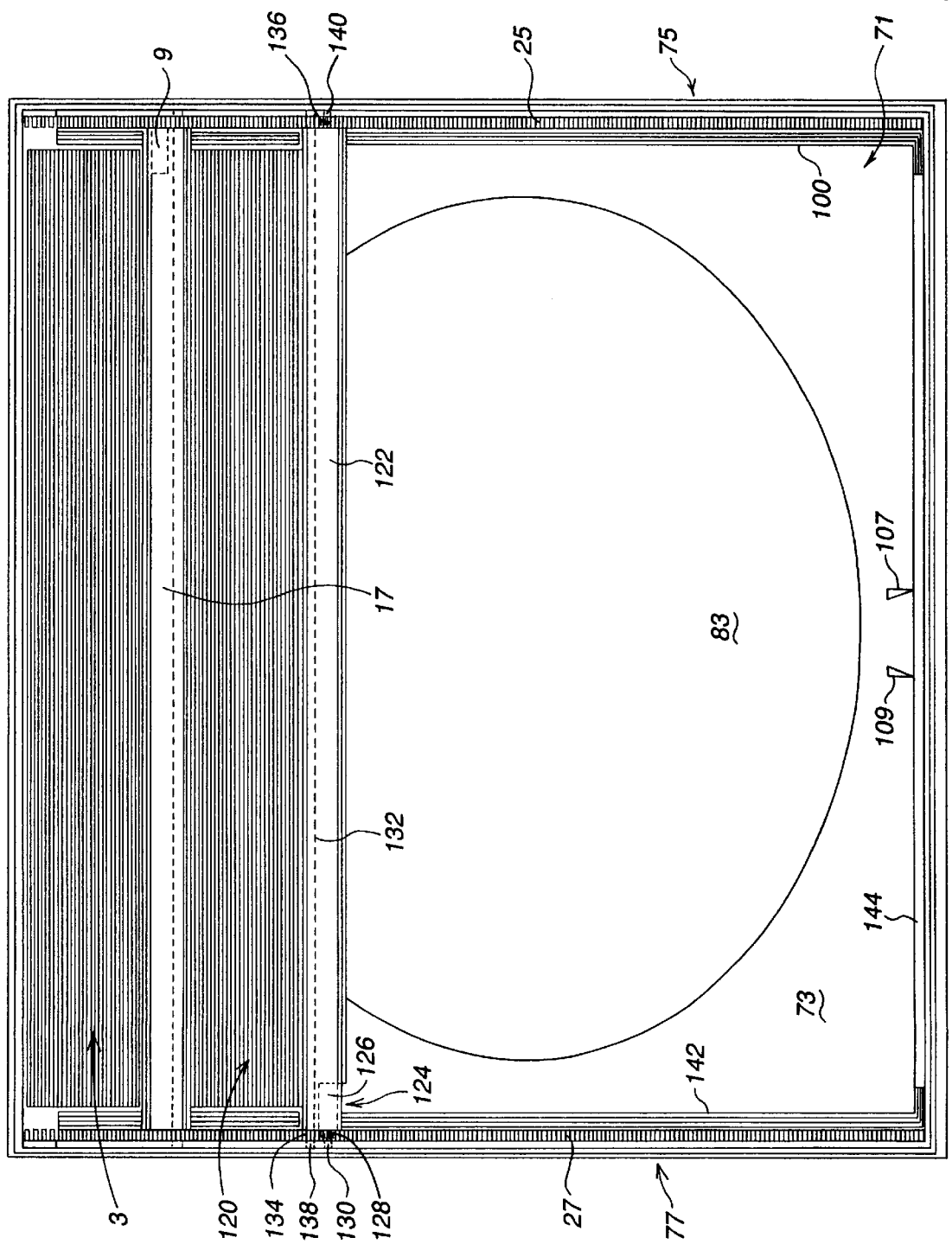

WINDOW ASSEMBLY WITH A MOTORIZED WINDOW SHADE MECHANISM

FIELD OF THE INVENTION

The present invention is directed to a window assembly with a motorized window shade mechanism and, in particular, to a window assembly that is adapted for aircraft and that is readily assembled and installed, and which provides convenient and reliable operation.

BACKGROUND OF THE INVENTION

A known window shade mechanism specifically adapted for aircraft windows utilizes cables and pulleys. A slidable actuator must be manually moved to operate the window shade. See U.S. Pat. No. 5,082,043. Reliance on manual operation is inconvenient because, for example, all the window shades on the aircraft cannot be operated simultaneously by one person. Also, the parts are particularly vulnerable to malfunction. Moreover, many components are required, and this reduces reliability while adding to the cost.

Another known approach provides a motor which is fixed in the window and operates the shade with cables and pulleys. See U.S. Pat. Nos. 5,515,898 and 4,998,576. However, this approach also requires numerous components which can only be manufactured, assembled and installed at considerable cost. Reliability is also compromised by the inclusion of so many parts.

Yet another approach attaches a motor to the lower bar, or rail, of the shade, and the motor moves along with the shade as it is extended and compressed. See U.S. Pat. No. 4,807,686. However, this approach also utilizes numerous components which raise the cost of manufacture and lower the reliability.

SUMMARY OF THE INVENTION

One object of the present invention is to provide an improved window assembly which includes a motorized window shade mechanism.

Another object of the present invention is to provide such a window assembly which utilizes fewer components.

A further object of the present invention is to provide such a window assembly having readily assemblable components.

Yet another object of the present invention is to provide an improved motorized window shade mechanism.

These and other objects are attained in accordance with one aspect of the present invention which is directed to a motorized mechanism for operating a window shade having a rail attached to one end of the shade to extend and compress the shade with movement of the rail. The mechanism includes a rail, a motor with a drive wheel coupled thereto, and an axle with traction wheels coupled to each end thereof. The motor is fixed to the rail and the axle is rotatingly coupled to the rail. The drive wheel is drivingly coupled to the axle so that motor operation to turn the drive wheel produces a corresponding rotation of the traction wheels at both ends of the axle to move the rail.

Another aspect of the present invention is directed to a motorized window shade assembly for operating a window shade having a rail attached to one end of the shade to extend and compress the shade with movement of the rail. The motorized window shade assembly includes a shell having two sidewalls, and a rail extending between the two sidewalls of the shell. The sidewalls have respective opposed inner surfaces with a channel therein, shoulders adjacent and perpendicular to the inner surfaces, respectively, and a traction surface on each of the shoulders. An axle is rotatingly coupled to the rail and having a traction wheel coupled to each end thereof. Opposite tips of the axle ride within the channels in the sidewalls, and the traction wheels engage the traction surface. A motor is attached to the rail and is drivingly coupled to the axle.

Yet another aspect of the present invention is directed to a motor control circuit for a motorized mechanism having two motors each of which operates one of two shade portions of a window shade. A sensing means detects arrival of the shade portions at an UP position or a DOWN position. A manually operable switch means designates operation of the window shade in either a DOWN direction or an UP direction in which the window shade is extended or compressed, respectively. A switch means is provided for automatically directing power to one of the two motors. A control means directs power to one of the motors in response to the manually operable switch means until the shade portion movable thereby reaches one of the UP and DOWN positions and, in response thereto, automatically switches the power to the other motor.

BRIEF DESCRIPTION OF THE DRAWING

FIG. 1 is an elevational view of a window assembly which includes a motorized window shade mechanism in accordance with the invention.

FIG. 2 is a cross section taken along line 2—2 of the window assembly of FIG. 1.

FIG. 3 is a cross section taken along line 3—3 of the window assembly of FIG. 1.

FIG. 4 is an exploded view corresponding to the window assembly as shown in FIG. 3.

FIG. 5 is an enlarged, fragmentary view of the right portion of the window assembly as shown in FIG. 2.

FIG. 6 is an exploded, perspective view of a rail for the bottom of the shade shown with a motor, an axle, associated toothed wheels and rack, in accordance with the invention.

FIG. 7 is an elevational view of one end of the rail of FIG. 6 into which the motor and axle are inserted.

FIG. 8 is a side view of the assembled rail, as shown in FIG. 7, and the motorized shade mechanism engaged with the rack.

FIG. 9 is an enlarged, fragmentary, perspective view of one end of a top strip of the rail as shown in FIG. 6, shown together with the bottom of the shade to which it is secured.

FIG. 10 is an end view of the rail.

FIG. 11 is a top view of the motor assembly.

FIG. 12 is an elevational view of the motor assembly.

FIG. 13 is a side view of the motor assembly.

FIG. 14 is a bottom view of the motor assembly.

FIG. 16 is an elevational view of a second embodiment of the invention.

DETAILED DESCRIPTION OF THE INVENTION

Figure 15:
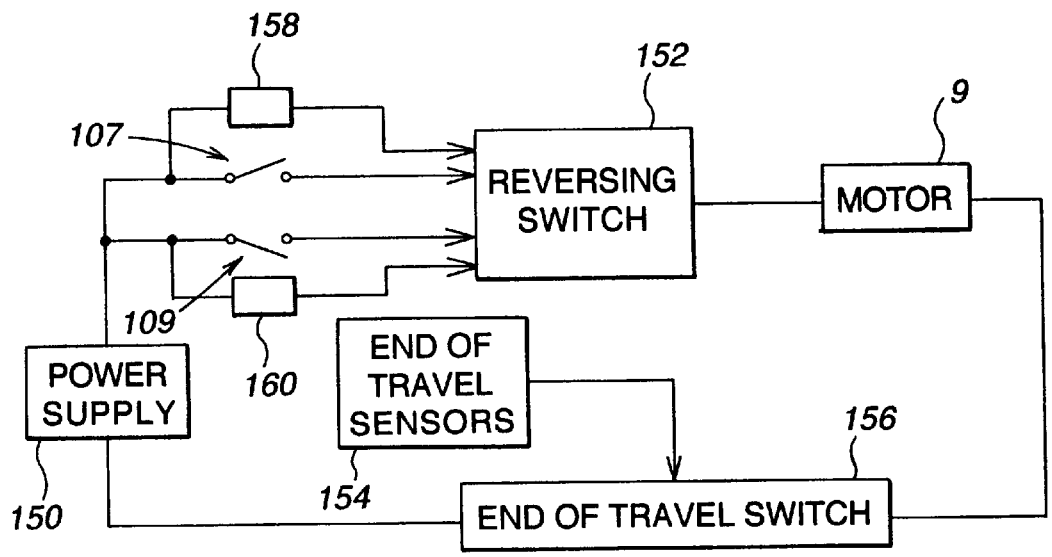
FIG. 15 is a schematic diagram of motor control circuit 101 in FIG. 1.

As shown in FIG. 1, window assembly 1 ("window" hereinafter) includes a window shade 3 which is positioned so that it can be deployed to block passage of at least some light through window 1. Window shade 3 is made of any known type of pleated material conventionally used for shades which can be compressed relatively tightly, to a height of less than one-half inch, for example, so that it occupies a minimal amount of space at the top of the window in order to provide an unimpeded view and to allow light to pass completely unobstructed through window 1. The shade can be extended to any desired position. When the shade is fully extended, however, it will obstruct the passage of light through the window either partially, if the material is sheer, or fully if the material is opaque.

Although window 1 can be any type of window set in any environment, the present invention is disclosed with particular applicability to an aircraft window. As shown in FIGS. 3 and 4, an aircraft window is contoured to fit the curvature of the particular aircraft body into which it will be installed, and has an inner pane 5 and an outer pane 7. Shade 3 is positioned within the interior space of the window between panes 5 and 7.

Window 1 includes a motorized mechanism 4 (see FIGS. 6–8) for operating window shade 3. The motorized mechanism provides full and reliable functionality of the window shade while minimizing the number of required components. In particular, motor 9 has an output shaft 11 on which a toothed drive wheel 13 is fixedly attached by press-fitting the drive wheel onto the shaft. A flat 16 on the end of shaft 11 matches a flat area (not shown) inside drive wheel 13 which prevents rotational motion of the wheel on the shaft. Drive wheel 13 has a hub 14 which projects axially by a preset distance, as explained below.

Motor 9 is sized for being securely inserted into one end of rail 17, details of which are provided below. Rail 17 is attached, in a manner to be explained below, to the bottom edge 19 of shade 3, as shown in FIGS. 6 and 9. Consequently, as motor 9 is energized to move rail 17 up and down along window 1, shade 3 is commensurately compressed and extended.

Movement of rail 17 corresponding to operation of motor 9 is accomplished by toothed traction wheels 21 and 23 of the motorized mechanism 4. These wheels are in operatively meshed engagement with racks 25 and 27, respectively (see FIGS. 1 and 8). Racks 25 and 27 are positioned laterally at the sides of window 1, as best shown in FIG. 1. Traction wheels 21 and 23 are attached at opposite ends of shaft, or axle, 29 which is accommodated within recess 31 in rail 17 (see FIGS. 6 and 10). Axle 29 has a flat spot 30 at both of its ends which matches a flat area in each of the traction wheels. The traction wheels are press-fit onto the axle. Traction wheel 21 meshes with drive wheel 13. Consequently, as motor 9 turns drive wheel 13, rotational torque is applied to traction wheel 21. This rotates axle 29 which turns traction wheel 23. Wheels 21 and 23 have respective hubs 22 and 24 which project axially by a preset distance, as explained below. Thus, with the just-described motorized mechanism 4, even though only one motor is used which applies direct rotational torque at one end of rail 17, no vertical twisting or binding of rail 17 occurs because traction wheels 21 and 23 are synchronized by axle 29 to provide smooth motion of rail 17 along racks 25 and 27.

In accordance with a salient aspect of the present invention, all the components are designed to facilitate assembly of the window assembly without reliance on separate fastening members. More specifically, as seen in the side view, or end-on view, of rail 17 shown in FIG. 10, rail 17 has a main body 18, and upper and lower strips 37 and 47. Axial recess 15 extends entirely through the length of the rail and is defined by sidewalls 33 and 35, and a top wall 38. The bottom of recess 15 is defined by a transverse member 39 having a flat upper surface. Recess 31 directly below recess 15 is formed as a circular hole which also extends axially through the entire length of body 18. The end of rail 17 into which motor 9 is inserted has a cutout 41 formed in it. More specifically, sidewall 35 is shortened where it terminates at end wall 36, and top wall 38 correspondingly terminates at axially facing end wall 43 and laterally facing end wall 45. Recess 15 is in communication with recess 31 via a channel-shaped opening in transverse member 39. The structure of rail 17 lends itself to fabrication by the poltrusion process. Rail 17 can be made of plastic, carbon, or a combination thereof.

Strip 37 has downwardly projecting arms 51 and 52 with respective end tabs 53 and 54 which are shaped and sized so as to snap-fit into notches 55 and 56 of sidewalls 33 and 35, respectively (see FIGS. 6 and 10). Thus, strip 37 can be snapped into its fixed position on body 18. If the pleated material at the bottom edge 19 of shade 3 is positioned under top strip 37, as shown in FIG. 9, and the strip is then snapped into position on body 18, bottom edge 19 of shade 3 is securely grasped by the tight fit of tabs 53, 54 within notches 55, 56 as well as by the abutment of arms 51, 52 against the sides of top wall 38.

Bottom strip 47 is formed in the same shape as top strip 37 and, in fact, they are identical. Strip 47 is snap-fit into a structure at the bottom of body 18 which is identical to that described in detail above at the top of body 18 for seating top strip 37 and, thus, a detailed description thereof is not deemed necessary. Strip 47 is not required for the first embodiment, and the bottom of rail 17 can be fabricated to have the same or similar shape which is attained with strip 47 placed in its installed position. However, strip 47 has several uses. For example, it can serve as a decorative strip. Also, it is required in connection with the second embodiment for holding the second, lower shade, as explained below.

As best seen in FIG. 10, sidewalls 33 and 35 have opposed interior surfaces 33*a* and 35*a* which are so shaped and so spaced from each other as to snugly and securely receive the cylindrical housing of motor 9 and its assembly (as described below) therebetween. Of course, the motor will undergo rotational reaction forces while it is energized. However, rotation of motor 9 within recess 15 is prevented by the cooperating structure of the motor assembly and rail 17, as explained below.

In accordance with another salient aspect of the present invention, window 1 includes a shell 71 which is shown in FIGS. 1–5. Shell 71 includes main body 73, shell sides 75 and 77, top 79 and bottom 81. Body 73 has a porthole 83 surrounded by a flange 85. The shape of porthole 83 is shown to be oval but, of course, it can be any selected shape. Outer pane 7 is sized and shaped to match porthole 83 and slightly overhang flange 85 (see FIG. 5). Sides 75 and 77 have opposed elongated, vertically extending channels 87 and 89 formed respectively therein (see FIGS. 2–5). The length of axle 29 plus hubs 22 and 24 is such that the hubs extend into and ride within channels 87 and 89, as explained below. Likewise, the length of drive wheel hub 14 is such that it extends into channel 87 just above hub 22. Racks 25 and 27 are positioned directly adjacent channels 87 and 89, respectively (see FIG. 5). With hubs 22 and 24 riding within channels 87 and 89, traction wheels 21 and 23 mesh with racks 25 and 27, respectively. Since the radius of drive wheel 13 is smaller than for the traction wheels, drive wheel 13 does not engage rack 25 (see FIG. 8). Shell 71 is made of injection molded plastic. Racks 25 and 27 are preferably formed as an integral element of shell 71.

Bottom 81 of shell 71 has a transverse channel 91 formed therein, as best shown in FIG. 4. It is sized to securely accommodate therein the bottom edge of inner pane 5. Top 79 of shell 71 has a transverse channel 93 formed therein which is sized to tightly receive therein strip 95. Wedge-shaped leading edge 97 of strip 95 facilitates the full insertion of the strip into channel 93. Strip 95 is T-shaped so that when it is fully inserted in channel 93, the lower leg 98 bears against the upper edge of inner pane 5 so as to keep it in position. Thus, channel 91 in bottom 81 of shell 71 and strip 95 cooperate to securely retain inner pane 5 in position on shell 71.

Printed circuit board 103 is secured to bottom 81 of shell 71. A motor control circuit 101 (see FIG. 15) is formed on board 103. Buttons 107 and 109, which are preferably of the well-known Mylar™ type, are connected to circuit 101 by conductive wires (not shown).

FIGS. 11–14 depict details of the motor assembly 58 which, of course, includes motor 9. Motor 9 is a reversible DC motor which is mounted to the top of a printed circuit board 60, such as by an epoxy type of adhesive. Multiple conductive lead lines 62 are formed on the bottom surface of board 60 to electrically connect terminals 64 with terminals 65. Projecting upward from board 60 is connector 66 which has a female plug 67 at its top and a male plug (not shown) at its bottom. Connector 66 can be of the ZIF (Zero Insertion Force) type, and it is soldered to board 60 so that the male plug makes an electrical connection with terminals 65. Motor 9 has multiple power and control leads 68 extending therefrom. The free ends of leads 68 are soldered to terminals 65 of board 60.

To energize motor 9, a flexible conductive ribbon 100 of a well known type, having multiple conductive lines, runs along the length of side 75 of shell 71. Conductive ribbon 100 has a plug, or pad, (not shown) at its upper end which is designed to mate with the top of plug 67 of ZIF connector 66. Ribbon 100 is free to move with motor 9 as it runs up and down rack 25. This type of arrangement is well known. The lower end of ribbon 100 is connected to motor control circuit 101. In fact, printed circuit board 103 and ribbon 100 are preferably combined into an integral unit available from All Flex Inc. of Northfield, Minn.

The window 1 with its window shade 3 and motorized window shade mechanism 4 is assembled as follows. After shell 71 and rail 17 have been fabricated in accordance with their respective descriptions as provided in detail above, axle 29 is inserted into recess 31 and traction wheels 21 and 23 are attached to the axle. Motor assembly 58 is then inserted into recess 15 until connector 66 abuts end 36 of wall 35. Board 60 rests on the top, flat surface of transverse member 39 and is sized to slidably engage walls 33 and 35 of recess 15. This arrangement of abutting components, namely board 60 and sidewalls 33 and 35, prevents motor 9 from rotating within recess 15 when torque is applied. With connector 66 being seated in cutout 41 and motor 9 thusly fully inserted into the position shown in FIG. 7, drive wheel 13 is meshed with traction wheel 21. Bottom edge 19 of shade 3 is placed under top strip 37 which is snapped into position on body 18 to firmly grip the shade and to secure it to rail 17.

Rail 17 is introduced into the interior of shell 71 by passing it through opening 99 in sidewalls 75 and 77 (see FIG. 4) until hubs 14 and 22 are seated in vertical channel 87 and hub 24 is seated in vertical channel 89. The fully compressed pleated material of shade 1 is also passed through opening 99 into the interior of shell 71. However, upper edge 105 of shade 3 remains behind and is tucked into channel 93 in shell top 79. Printed circuit board 103 is secured to bottom 81 of shell 71 and ribbon conductor 100 which extends therefrom is laid upward along side 75 of shell 71. The free end of ribbon 100 is then plugged into ZIF connector 66, and the wires from actuating buttons 107 and 109 are connected to circuit 101.

Inner pane 3 is slipped into lower transverse channel 91 and then placed in abutment against shell 71. As strip 95 is inserted into channel 93, top edge 105 of the shade is firmly gripped by strip 95 and is retained securely in position thereby, Strip 95 also keeps inner pane 5 in position. Outer pane 7 is attached adhesively to shell 71.

It should be noted that transverse motion of motor 9 in shell 71 is prevented due to the following relationship. Hub 14 of drive wheel 13 abuts the sidewall (or "bottom") of channel 87 and connector 66 abuts end 36 of sidewall 35. Thus, motor 9 is prevented from moving to the left (as shown in FIG. 7) by connector 66 and to the right by hub 14.

Control circuit 101 is shown in FIG. 15. Motor 9 receives power from power supply 150 via actuating buttons 107, 109 and reversing switch 152 which can be of the well known bridge type having solid state relays conventionally used for a DC motor. Switch 152 can incorporate control circuitry therein for the relays. When actuating button 107 (the DOWN button) is pressed, relays in those legs of the bridges are closed (in a well known manner) which cause the motor to rotate in a direction to extend shade 3. Likewise, when actuating button 109 (the UP button) is pressed, relays in the other legs of the bridge are closed, and those cause the motor to rotate in a direction to compress shade 3. DOWN and UP sensors 154 are provided to detect when the shade reaches its end-of-travel positions. In other words, when rail 17 reaches a position where shade 3 is fully extended, a sensor 154 (such as one positioned at the bottom of the window) outputs a DOWN end-of-travel signal, and when shade 3 is fully compressed, a sensor 154 (such as one positioned at the top of the window) outputs an UP end-of-travel signal. The output from sensors 154 is provided to end-of-travel switch 156 which is normally closed. Switch 156 opens in response to either of the DOWN and UP end-of-travel signals to de-energize the motor 9.

The circuit of FIG. 15 operates as follows. It should be understood that the "end-of-travel" expression is used interchangeably hereinbelow in connection with the rail, motor and/or shade. In actuality, it is related, of course, to the position reached by the rail. When the shade is fully compressed, i.e., rail 17 is in its UP-most position, and DOWN button 107 is pressed, reversing switch 152 will cause current to flow from power supply 150 through motor 9 in a direction to rotate it so as to extend the shade. Motor 9 will continue to operate as long as button 107 remains depressed. Shade 3 can be stopped anywhere along the window just by releasing button 107 which de-energizes motor 9. However, if button 107 remains pressed until sensor 154 produces a DOWN end-of-travel signal, switch 156 will open thereby breaking the circuit and causing motor 9 to stop. Switch 156 is of the momentary-open type so that it resets automatically to its normally closed condition after a predetermined time period, such as 5 seconds. Of course, by the time this predetermined time period expires, button 107 will have been released so motor 9 remains de-energized despite closure of switch 156. If, however, the shade is to be raised, after resetting of switch 156 this would be possible by simply pressing UP switch 109.

Analogously, upward motion of shade 3 continues as long as button 109 is pressed or until sensor 154 provides an UP end-of-travel output signal to switch 156.

Normally-open bypass DOWN switch 158 and normally-open bypass UP switch 160 can be used for several purposes. For example, a single bypass DOWN switch 158 can be coupled to all of the windows so that they all can be operated simultaneously merely by closing this one switch. The same can be done with bypass UP switch 160. Also, if switches 158 and 160 are connected in circuit to operate only a single window shade, the bypass switches can be operated by wired or non-wired remote controls located in the seat arm rest, for example, to provide added convenience and ease of use for the passengers.

With the above-described window assembly being completed, the entire window 1 is positioned within a suitable opening prepared in the aircraft body and secured thereto in a well known manner, such as with ears 111 and 113 (FIG. 2) details of which are not deemed necessary. Likewise, power from the main power supply 150 is provided to the motor control circuit 101 in each window in a known manner readily apparent to anyone with ordinary skill in the art. Power is supplied via wires (not shown) that pass through the shell and are connected to the motor to energize motor 9 with operation of the actuating buttons 107 and 109. Thus, as described above, by pressing actuating button 107, motor 9 will be rotated in one direction to extend shade 3, whereas pressing actuating button 109 will cause reverse rotation of motor 9 to raise rail 17 and thereby compress shade 3.

With this arrangement, a reliable, smooth and effective operation of shade 3 is attained. As hubs 14, 22 and 24 travel within the confines of vertical channels 87 and 89, rail 17 is smoothly guided up and down without any horizontal twisting motion or spinning around its axis. Likewise, by having traction wheels 21 and 23 driven simultaneously and synchronously by one motor via the same axle, vertical twisting and binding is prevented.

The motor assembly 58 is available from API Portescap of Zurich, Switzerland. Panes 5 and 7 are made of Lexan™, a clear polycarbonate sheet available from DuPont. Wheels 13, 21 and 23 are made of a plastic compound available under the brand name Delrin™. Shell 71 is made of reinforced plastic or a resin composite.

FIG. 16 depicts a second embodiment of the invention. Parts in FIG. 11 which are the same as in previous drawings are identified with the same reference numerals. Thus, it is readily apparent that FIG. 16 is identical to FIG. 1 with respect to window shade 3 and the parts associated therewith. However, this embodiment also includes a second window shade 120. The top of shade 120 is retained in place by lower strip 47 of rail 17. Shade 120 has a rail 122 which is identical to rail 17. The lower edge of shade 120 is attached to rail 122 in a similar way as described above for the attachment of lower edge 19 of shade 3 to rail 17.

Shade 120 has its own motorized mechanism 124 which includes motor 126, and toothed drive wheel 128 with axially extending hub 130. Axle 132 has attached at its ends traction wheels 134 and 136 with respective hubs 138 and 140. Drive wheel 128 is operatively meshed with traction wheel 134, and wheel 134 is meshed with rack 27. Traction wheel 136 is meshed with rack 25. Hubs 130 and 138 ride within vertical channel 89, and hub 140 rides within vertical channel 87 (reference numerals 87 and 89 are not shown in FIG. 16). Conductive ribbon 142 runs the length of side 77 from motor control circuit 144 at shell bottom 81 and is connected to motor 126 so as to be movable therewith.

Ribbons 100 and 142 are on opposite sides of shell 71 so as not to interfere with each other as rails 17 and 122 move along window 1. Also, whereas rail 17 is oriented so that motor 9 is positioned above axle 29, rail 122 is "upside down" in that motor 126 is positioned below axle 132. This arrangement makes it possible to connect ribbon 100 to motor 9 from the top of rail 17, whereas ribbon 142 is connected to motor 126 from under rail 122. In this way neither one of ribbons 100 and 142 extends into the area between rails 17 and 122 where it would be interfered with by window shade 120.

Figure 17:
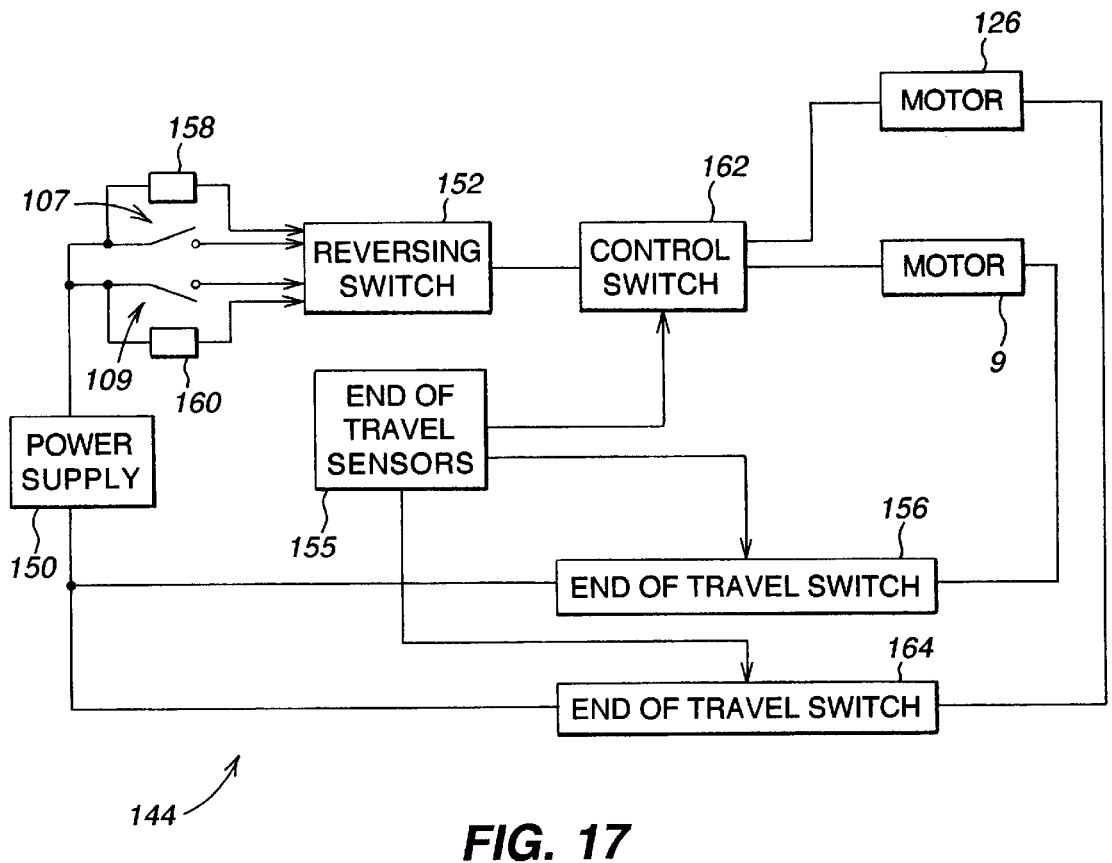
FIG. 17 is a schematic diagram of motor control circuit 144 in FIG. 16.

Control circuit 144 is shown in FIG. 17. Components in FIG. 17 which are the same or similar to those in FIG. 15 are identically numbered. FIG. 17 includes the following added components: motor 126, control switch 162, end-of-travel sensors 155 and end-of-travel switch 164. Sensors 154 in FIG. 15 were operable with respect to only motor 9 and/or rail 17. Sensors 155 are positioned and arranged to include sensors 154 and, in addition, other sensors operable with motor 126 and/or rail 122. The grouping of all these sensors together as "sensors 155" is done for the sake of brevity, ease of depiction on the drawings, and to facilitate the explanation and understanding thereof. End-of-travel switch 156 is in circuit with motor 9, as in FIG. 15, while end-of-travel switch 164 is in circuit with motor 126.

The function of control switch 162 is to controllably alternate the supply of power between motors 9 and 126. Only one of these motors is energized at any given time.

Figure 18:
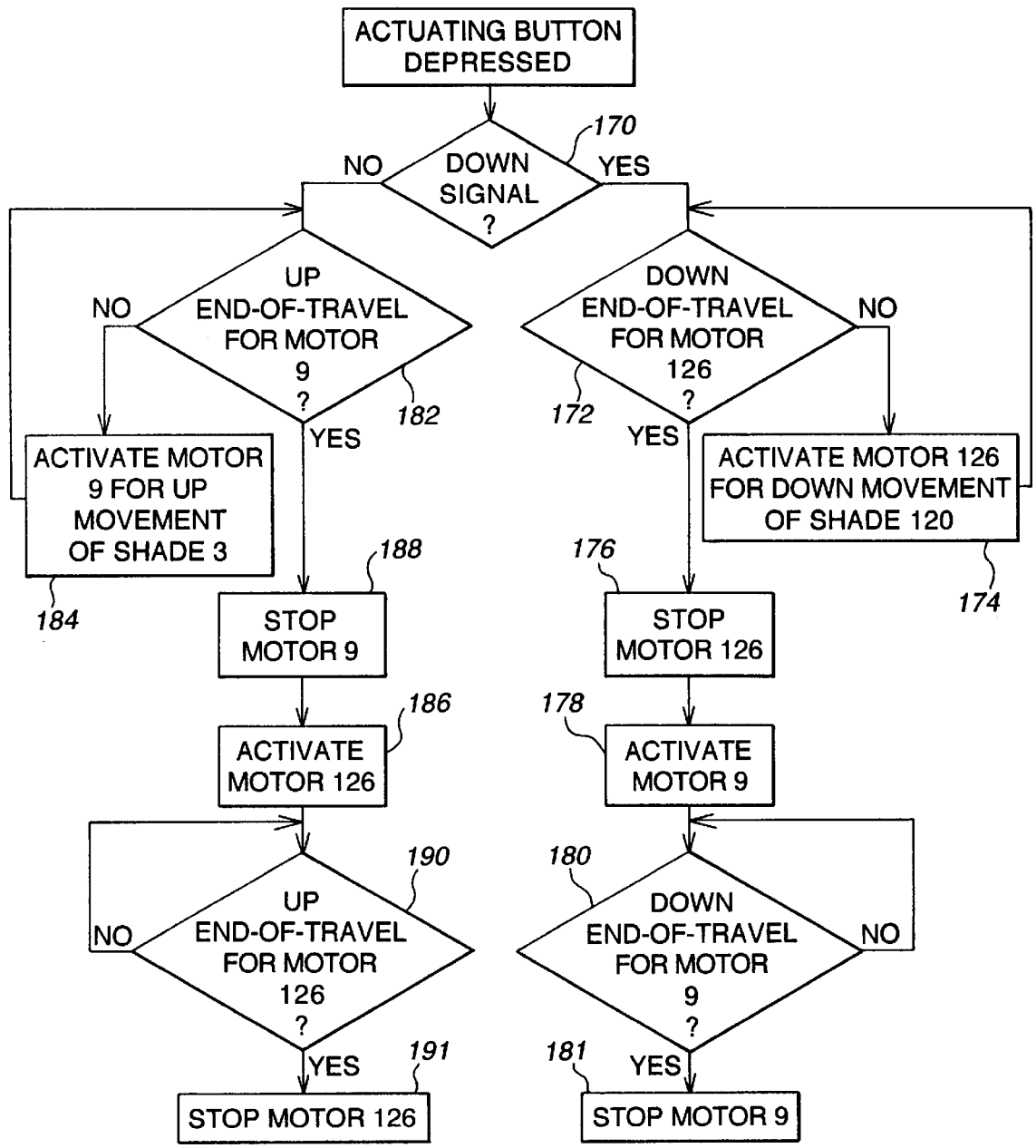
FIG. 18 is a flow chart for the circuit of FIG. 16.

Operation of control circuit 144 can be more readily understood in connection with FIG. 18. When shades 3 and 120 are both fully compressed, for example, and DOWN button 107 is pressed, step 170 (DOWN SIGNAL?) produces a YES response and step 172 (DOWN END-OF-TRAVEL FOR MOTOR 126?) a NO. Consequently, motor 126 will be activated to extend shade 120 in accordance with step 174 until its end-of-travel position (DOWN position) at the bottom of the window is reached. At that point, motor 120 is stopped, i.e., de-energized, per step 176 by opening switch 164, as explained above with respect to switch 156. Then, control switch 162, responding to a DOWN end-of-travel signal for motor 126 from sensors 155, switches power over to motor 9 per step 178. Motor 9 is energized as long as button 107 is pressed, and because switch 156 is in its normally closed condition. Current flows through motor 9 to cause its rotation in a direction to extend shade 3 until step 180 determines that its end-of-travel position (DOWN position) at the bottom of the window is reached.

If button 109 is pressed while both shades are fully extended with rails 17 and 22 being in their DOWN positions, step 170 answers NO (because button 109 outputs an UP signal), step 182 also answers NO, so step 184 activates motor 9 to compress shade 3. Motor 9 is activated because control switch 162 continues to direct power to it after step 178 has been performed. When sensors 155 detect the end-of-travel position (UP position) for rail 17 at the top of the window, per step 182, this causes switch 156 to de-energize motor 9, per step 188, and control switch 162 to flip its state to feed power to motor 126, per step 186. When operation of motor 126 causes shade 120 to be fully compressed at the top of the window (UP position), step 190 de-energizes motor 126 by opening switch 164. This description has explained a full cycle of shade operation starting with both shades 3 and 120 being in the UP position, to full extension of shade 120 to its DOWN position as shade 3 remains compressed, then full extension of shade 3 to its DOWN position, back to fully compressing shade 3 to its UP position as shade 120 remains fully extended, and finally to full compression of shade 120 back to its UP position. Of course, intermediate positions of the shades can be attained by simply releasing whichever one of buttons 107 and 109 is being depressed when the desired shade position is reached.

Figure 19:
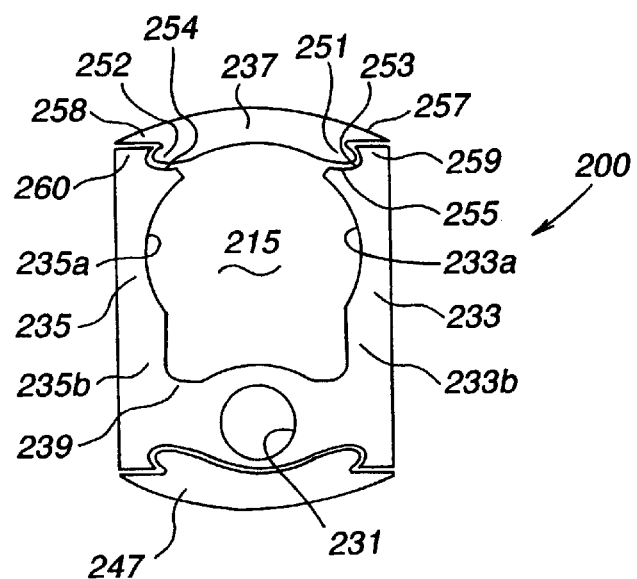
FIG. 19 is a second embodiment of the rail.

FIG. 10 shows one embodiment of rail 17. However, other embodiments are also contemplated. In particular, FIG. 19 shows a side view of rail 200 which has a main body 218 made of injection molded plastic, and also includes upper and lower strips 237 and 247. Recess 215 is defined by sidewalls 233 and 235, and a top wall formed by strip 237. The bottom of recess 215 is formed by a transverse member 239. Recess 231 is formed as a circular hole which extends entirely through body 218.

Strip 237 has downwardly projecting ridges 251 and 252 which are shaped and sized so as to be forcibly seatable within notches 253 and 254 of sidewalls 233 and 235, respectively. Thus, strip 237 can be snapped into its fixed position on body 218. The projection of ridge 251 is such that it abuts shoulder 255 of notch 253 just as overhang 257 of top strip 237 abuts upper end 259 of sidewall 233. The same arrangement is shown for ridge 252. Consequently, if the pleated material at the bottom edge 19 of shade 3 is positioned under top strip 237, similarly to the arrangement as shown in FIG. 9 for top strip 37 and strip 237 is then snapped into position on body 218 to close recess 215, bottom edge 19 of shade 3 is securely grasped by the tight press-fit of ridges 251, 252 within notches 253, 254 as well as by the abutment of overhangs 257, 258 against upper ends 259, 260 of sidewalls 233, 235.

Bottom strip 247 is formed in the same shape as strip 237 and, in fact, they are identical. Strip 247 is press-fit into a structure at the bottom of body 218 which is identical to that described in detail above at the top of body 218 for seating strip 237 and, thus, a detailed description thereof is not deemed necessary.

Sidewalls 233 and 235 have opposed interior surfaces 233a and 235a which are circular arcs so shaped and so spaced from each other as to snugly and securely receive the cylindrical housing of motor 9 therebetween. Since rail 200 is made of plastic, sidewalls 233 and 235 will have a little "give" in order to enhance the inwardly directed radial force which they apply to the exterior of motor 9 so as to firmly keep it in place during motorized shade operation. This force need not be large because transverse forces on the motor during such operation are minimal, if any. Of course, the motor will undergo rotational reaction forces while it is energized. However, rotation of motor 9 within recess 215 is prevented by, for example, a projection (not shown) extending laterally therefrom which mates with a corresponding structure (not shown) of body 218.

It is also noted that sidewalls 233 and 235 include respective lower end portions 233b and 235b which are substantially vertically straight. The purpose of lower wall portions 233b and 235b is to space motor 9 from axle 29, and the length of these wall portions is selected based on the specific dimensions chosen for drive wheel 13 and traction wheel 23 so that their teeth mesh fully and properly in order to transmit motor torque to the traction wheels.

Figure 20:
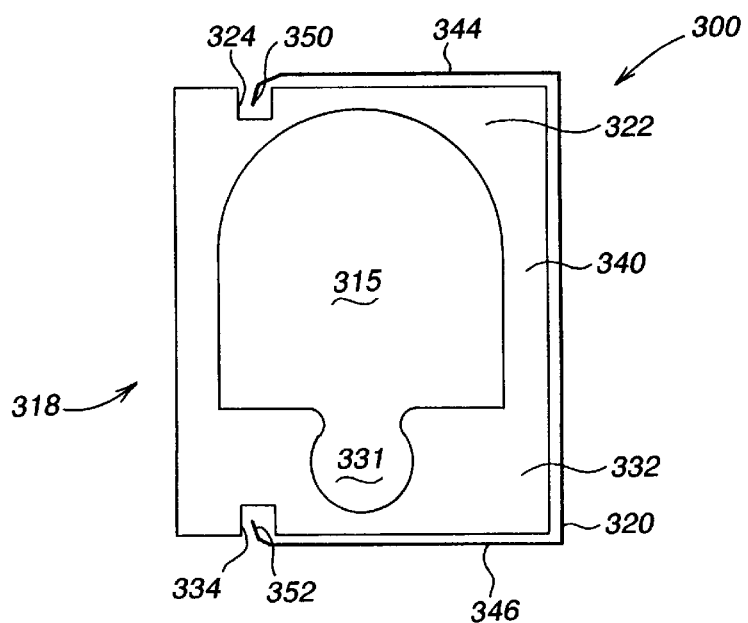
FIG. 20 is a third embodiment of the rail.

FIG. 20 shows a third embodiment for the rail. Rail 300 is similar to rail 17 (FIG. 10) in that recesses 315 and 331 are identical to recesses 15 and 31, respectively. The main distinctive feature of rail 300 is that it does not have upper and lower strips. Instead, a C-shaped clamp member 320 runs the entire length of body 318. Although body 318 is generally similar to body 18, the exterior shape of body 318 is relatively simpler than that of body 18. Upper wall 322 has a channel 324 notched therein, and lower wall 332 has a channel 334 notched therein. Clamp 320 is sized to fit around bottom wall 332, side wall 340 and top wall 322. Arms 344 and 346 of clamp 320 terminate with respective inwardly projecting edges, or tabs, 350 and 352. Tabs 350 and 352 snap into notches 324 and 334, respectively.

The fabric at one end of a shade is secured to rail 300 by clamp 320 as follows. The end of the fabric is laid on top of wall 322 with the edge of the fabric somewhere between notch 324 and side wall 340. When clamp 320 is snapped onto body 318, the fabric is pinched by tabs 350 and 352 within notches 324 and 334 In addition, arm 344 presses the fabric against top wall 322. The advantages of rail 300 include fewer parts and simpler shapes which can result in lower manufacturing costs.

Although preferred embodiments of the present invention have been disclosed in detail above, various modifications thereto will be readily apparent to one with ordinary skill in the art. For example, window 1 can be flat rather than curved. Outer pane 7 can be attached to shell 71 with various fastening methods and devices. Various control functions of the motor control circuit can be performed by a suitably programmed microprocessor. Sensors 154 and 155 can be fixed on the window and respond to the presence of the shade or motor in their proximity, or such sensors can be on the motor and generate a signal in response to motion. Hubs 14 and 130 of drive wheels 13 and 128 need not extend into channels 87 and 89. A bearing arrangement for axle 29 could be included in recess 31. The drive wheel on the motor could be coupled to the axle elsewhere than at the end of the rail. The motor could be attached to the rail in ways other than being inserted into recess 15. Strips 37, 47 and clamp 320 are all types of attachment members for securing the shade to the rail. Various other attachment members can be used which do not require a separate element (e.g., adhesive, special part) to secure the attachment member to the rail. The drive and traction wheels need not be gears. Other driving arrangements which utilize a traction surface other than a rack can also be used. Such other traction surfaces with cooperating wheel designs are well known. Instead of having the different shade materials arranged as shown in FIG. 16 with both moving in the same set of channels 87 and 89, they could be placed one behind the other in two separate sets of channels to provide greater flexibility of movement and control of light passing through the window. These and all other such modifications are intended to fall within the scope of the present invention as defined by the following claims.

I claim:

1. A motorized mechanism for operating a window shade having a rail attached to one end of the shade to extend and compress the shade with movement of the rail, comprising:

a rail;

a motor with a drive wheel coupled thereto;

an axle with traction wheels coupled to each end thereof;

wherein said motor is fixed to said rail and said axle is rotatingly coupled to said rail, said drive wheel being drivingly coupled to said axle so that motor operation to turn said drive wheel produces a corresponding rotation of said traction wheels at both ends of said axle to move said rail;

wherein said rail comprises a main body and at least one attachment member adapted to snap-fit onto said main body and thereby secure one end of the shade to said rail; and wherein said main body comprises a top wall and a bottom wall, and said attachment member comprises an elongated C-shaped clamp which snaps into said top and bottom walls.

2. A motor control circuit for a motorized mechanism having two motors each of which operates one of two shade portions of a window shade, comprising:

sensing means to detect arrival of said shade portions at an UP position or a DOWN position;

manually operable switch means to designate operation of the window shade in either a DOWN direction or an UP direction in which the window shade is extended or compressed, respectively;

switch means for automatically directing power to one of the two motors; and control means for directing power to one of the motors in response to said manually operable switch means until the shade portion movable thereby reaches one of said UP and DOWN positions and, in response thereto, automatically switching the power to the other motor.

3. The motor control circuit of claim 2, wherein said UP and DOWN positions are end-of-travel positions in which a shade is either fully extended or fully compressed.

4. The motor control circuit of claim 2, wherein said switch means de-energizes said one motor when power is automatically switched to the other motor.

* * * * *